Nov. 7, 1933.  E. M. LIVINGSTON  1,934,077
METHOD OF SHEARING AND REFORMING CONTINUOUS JOINT BARS
Filed Jan. 10, 1929  2 Sheets-Sheet 1
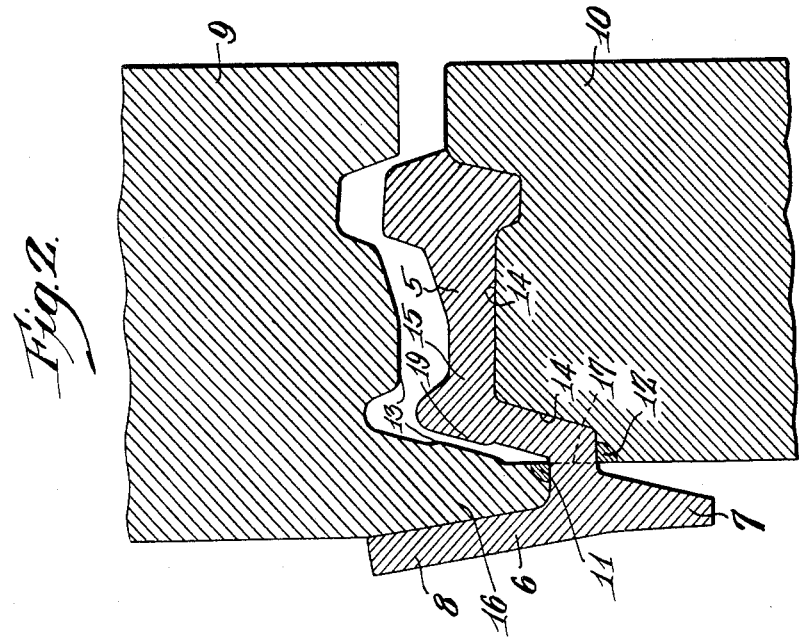
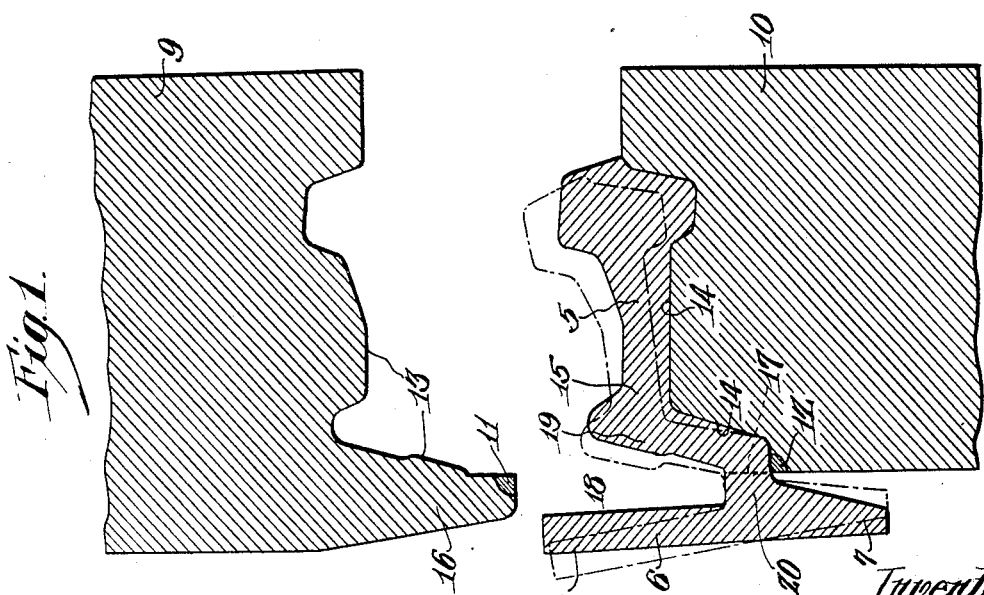
Inventor
Edmund M. Livingston
by
Attorney Nov. 7, 1933. E. M. LIVINGSTON 1,934,077
METHOD OF SHEARING AND REFORMING CONTINUOUS JOINT BARS
Filed Jan. 10, 1929 2 Sheets-Sheet 2
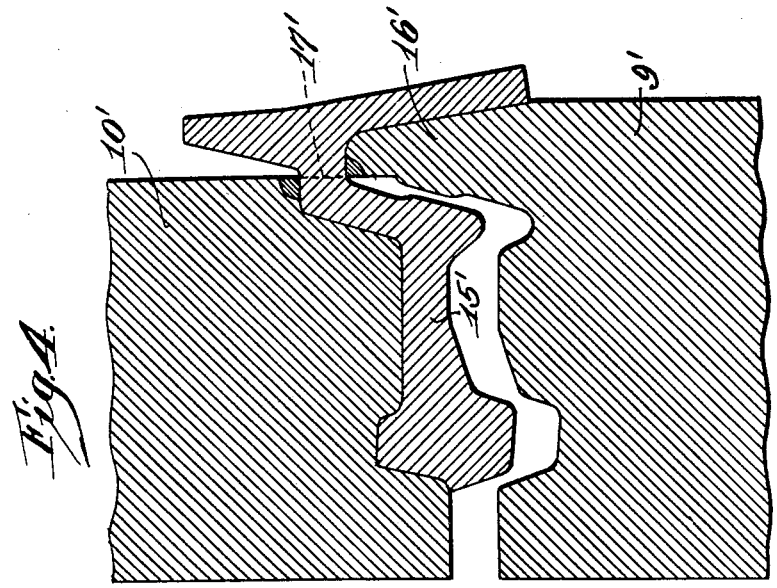
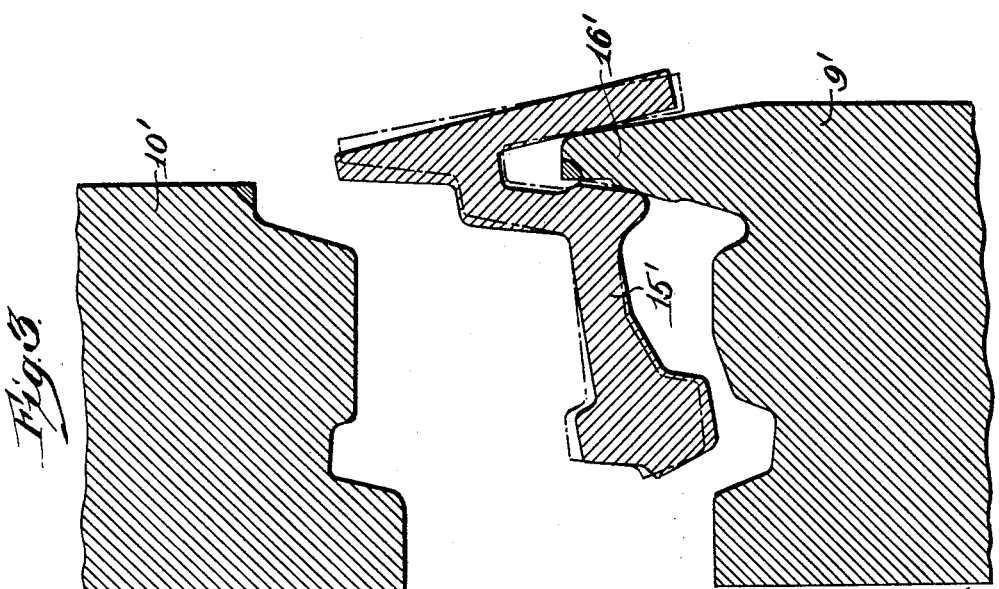
Inventor
Edmund M. Livingston
by
Attorney Patented Nov. 7, 1933

1,934,077

UNITED STATES PATENT OFFICE 1,934,077

METHOD OF SHEARING AND REFORMING CONTINUOUS JOINT BARS

Edmund M. Livingston, Lansdowne, Pa.

Application January 10, 1929. Serial No. 331,631

3 Claims. (Cl. 29—169)

My invention relates to a method of shearing and reforming continuous joint bars into joint bars of L section.

A purpose of my invention is to simultaneously shear off the bottom of a continuous joint bar and to form its upper portion into any desired L section.

A further purpose is to mount shear blades upon cooperating forming dies using a single stroke of the reciprocating member of the pair to shear off the bottom of a continuous joint bar and to suitably reform the remaining portion of the bar to any desired sectional contour.

Further purposes will appear in the specification and in the claims.

I have elected to illustrate my invention in one main form only, illustrating however that either one of the two cooperating members may be movable while the other member is stationary.

Figure 1 is a vertical section through the cooperating die and shear members of a machine embodying my invention showing the cooperating members separated and a continuous joint bar in position upon the lower member preparatory to the downward movement of the upper member for simultaneously shearing and forming.

Figure 2 is a view of the parts shown in Figure 1 but with the parts advanced for shearing and forming.

Figures 3 and 4 are views generally similar to structure shown in Figures 1 and 2 except that the position of the operating members has been reversed, the stationary and movable members of Figures 1 and 2 being respectively movable and stationary in Figures 3 and 4, Figure 3 showing the members separated and a continuous joint bar on the lower member while Figure 4 shows the same parts after the upper member has moved down for shearing and forming.

Like numerals refer to like parts in all figures.

Describing in illustration and not in limitation and referring to the drawings:—

The trend of present practice in the railroad art is to replace the so-called continuous joint bars illustrated in section in the figures with the so-called L type of bars.

In the continuous joint bars that are now being replaced a bottom portion has extended downwardly along the outer edge of the rail flange and then flanged inwardly and outwardly.

The inward flange of the foot of the continuous bar has extended under the rail inwardly to near the middle of the rail, the bottom of the inwardly extending flange of one bar reaching to a point closely adjacent to the corresponding inwardly directed bottom flange from the bar on the opposite side of the rail.

The continuous joint bars already in use are being modified when removed from use by shearing off their bottom portions and subsequently reforming their upper portions into L type bars.

The many continuous bars still in service and being gradually displaced by bars of the L type, are thus affording as removed from service a source for the manufacture of the L type of bars which have sectional contours somewhat variant but sufficiently near those of the bodies of the continuous bars to permit the bodies of the continuous bars to be readily reformed into the L bars after the bottom portions of the continuous bars have been sheared away.

Hitherto the shearing off of the bottom portions and the reforming of the upper portions of the continuous bars have been performed in separate operations, and usually the shearing off of the bottom portion of each bar has required at least two shearing strokes.

My invention is directed at a pair of cooperating engagement members for, and method of, modifying continuous splice bars in which I use a single operating stroke of one of the members to shear away the bottom portion of the continuous splice bar and to reform the upper portion thereof to the desired L type contour.

I have illustrated my cooperating members without showing the mechanism for reciprocating one of the members in that this mechanism may comprise any suitable commercial press mechanism such as is now used for effecting the operating stroke of a reforming die member.

A typical continuous bar as illustrated in section in Figures 1 and 2 has a body portion 5 that is in section very like the section of the L type bar and a bottom portion 6 that includes a plate member which in use lies on the tie, extending outwardly at 7 to some distance beyond the rail flange and inwardly at 8 to approximately the middle of the rail.

Normally the bottom portion 8 of one continuous bar has been met or nearly met by the corresponding bottom portion of the cooperating bar upon the other side of the rail and the cooperating continuous bars were thus intended to present a substantially continuous reinforcement plate across the bottoms of the adjoining rail ends, the bars having been for this reason called continuous bars.

In the structure shown in Figures 1 and 2 each of the cooperating members 9 and 10 includes a shear blade 11 or 12 and a forming die portion 13 or 14 respectively.

In Figure 1 the continuous joint bar 15 has been placed upon the upwardly directed lower die and shear member 10 and the movable downwardly directed upper member 9 is shown in raised position for the easy placement of the continuous joint bar between the members.

The cooperating shear blades 11 and 12 should be of high speed steel, such as stellite. They are fastened to place at the outer edges of the die members in any suitable way, as by welding, with the cutting edges properly alined for shearing.

The joint bar 15 is preferably softened by suitable heating, to some such temperature as 1600° to 1700° F. preparatory to its placement upon the lower die, the die members being kept from overheating during their operation upon successive bars by suitable cooling.

After a continuous joint bar has been placed so that its body portion 5 is inclosed between the members 9 and 10 the lower edge of the plane 17 of ultimate shearing should rest along the outer edge of the shear blade 12, and when the upper member 9 starts down, the operator should desirably suitably tilt the bar outwardly about the outer edge of the shear blade as a pivot as to the position shown in dot-and-dash, Figure 1, so that the downwardly projecting nose 16 of the die member may enter and wedge its way into the space 18 between the portions 8 and 19 of the continuous bar, the upper and lower surfaces of the body portion 5 of the bar being forced into conformation with the lower and upper die surfaces during the shearing travel of the upper shear blade.

The bottom portion 8 of the bar is progressively spread away from the heel portion 19 during the descent of the member 9 and this spreading action tends to tear open the rail fibers at the upper side of the plane 17 so that when the upper blade finally engages the connecting portion 20 of the bar the shearing which takes place along the full length of the bar is relatively easy.

One of the advantageous features of my invention is the mounting of the shear member 11 upon a nose 16 that is adapted to wedge or spread apart the opposing surfaces of the hook portion of the continuous bar.

I am thus able to shear the bar along the plane 17 which has hitherto not been done, and also make the shearing more easy in that the fibers in front of the shear blade 11 are already under heavy tension stresses by reason of the spreading of the hook when the shear blade engages them.

It has been considered unnecessary to show side views of the die members, in that the dies are of substantially uniform section. They should be sufficiently long to simultaneously cut and form the continuous bar along its whole length and the upper and lower shears are preferably parallel and horizontal.

I usually prefer to make the member 9 which carries the die for forming the side of the bar that engages the rail and which carries the nose 16, the upper and movable member, with the cooperating member 10 stationary but obviously if desired this arrangement may be reversed, and I have illustrated this in Figures 3 and 4 where the upper member 10' corresponds to the lower member 10 of Figures 1 and 2 and the lower member 9' corresponds to the upper member 9 of the earlier figures.

In the arrangement shown in Figures 3 and 4 the continuous joint bar 15' is hooked for its full length over the top of the upwardly projecting nose portion 16', the body of the bar extending in between the jaws of the two members as before except that the bar and dies are inverted as compared to their positions in the structure of Figures 1 and 2.

The operator preferably suitably tilts the bar so that the descending member 10' presents the outer edge of the shear member along the upper side of the desired shear plane 17', and continuing its downward travel forces the body of the bar to place between the cooperating dies and effects simultaneous forming and shearing in the same way as with the form of Figures 1 and 2.

In operation the continuous bars are heated in a reheating furnace to a suitable softening which is most desirably 1600° to 1700° F. where the character of the steel used for the shears will permit cutting at this temperature, but may be much lower than this. The bars are operated upon one after another by the shear and die members successively.

After each operating stroke the moving member is retracted and then held in its retracted position a short interval to remove the formed L bar from the lower die and to put in another continuous bar that has not yet been sheared and re-formed.

Where I refer to high speed steel it has been for the purpose of taking advantage rather of the special characteristic of this steel, namely, that it will continue to cut efficiently at high temperatures and not because of any thought of cutting at high speed.

The capacity for cutting at high temperatures enables me to cut and form the bars with lower press pressures than would otherwise be the case and with a lower total energy consumption both in the cutting and reforming operations. In making special reference to stellite I have no thought therefore of in fact requiring stellite but only of suiting the cutting steel to the requirements of cutting at the temperature selected, in which selection the advantage of low pressures and of efficiency at high temperatures will be balanced as the temperatures are raised; reaching an ultimate balance in the selection of a temperature which will differ with the special views of the individual designer and with the requirements of thickness of steel at the cutting point, extent of reforming intended and special character of the steel operated upon.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of producing an L type splice bar from a continuous splice bar, which consists in supporting the continuous splice bar with its web in horizontal position, in shearing the base from the bar in a direction transverse to the web of the bar, while wedging the base angularly away from the web of the bar, and in reforming the bar while maintaining the position of the bar unchanged.

2. The method of producing an L-type splice bar of uniform section from a continuous splice bar which has been subjected to wear, which consists in heating the bar to forging temperature, and while it is still at forging temperature spreading the bottom portion of the splice bar base away from the foot, shearing off the base portion from the remainder of the splice bar and subjecting opposite contour faces of the splice bar to pressure sufficient to restore the splice bar to a serviceable condition, all at the same position of the splice bar.

3. The method of producing an L-type splice bar from a continuous splice bar which has been worn in use, which consists in spreading the bottom portion of the splice bar away from its foot, in cutting the bottom part away from the foot at forging temperature and in subjecting opposite contour faces of the bar to pressure to restore it to serviceable condition, all at the same position of the splice bar.

EDMUND M. LIVINGSTON.